United States Patent [19]

Crespin

[11] Patent Number: 4,649,757
[45] Date of Patent: Mar. 17, 1987

[54] DEVICE FOR CALIBRATING A MACHINE TOOL

[75] Inventor: Gerard Crespin, Villeurbanne, France

[73] Assignee: Framatome & Cie., Courbevoie, France

[21] Appl. No.: 724,446

[22] Filed: Apr. 18, 1985

[30] Foreign Application Priority Data

Apr. 20, 1984 [FR] France ............................... 84 06295

[51] Int. Cl.[4] .......................... G01L 5/16; G01L 3/18
[52] U.S. Cl. ............................... 73/862.06; 73/1 C; 73/104; 73/862.12
[58] Field of Search .................... 73/1 C, 104, 862.06, 73/862.12, 862.13

[56] References Cited

U.S. PATENT DOCUMENTS

| 3,382,710 | 5/1968 | Aubeges et al. ............. 73/1 C X |
| 3,457,780 | 7/1969 | Agostini ..................... 73/1 C X |
| 4,090,403 | 5/1978 | Tsukada et al. ................ 73/104 |
| 4,178,799 | 12/1979 | Schmieder et al. ......... 73/862.06 X |
| 4,483,177 | 11/1984 | McIntyre et al. ................ 73/1 C |
| 4,485,681 | 12/1984 | Hatamura ................. 73/862.06 X |

FOREIGN PATENT DOCUMENTS

| 1224574 | 6/1960 | France . |
| 2078847 | 11/1971 | France . |
| 0127546 | 6/1959 | U.S.S.R. ................ 73/862.06 |
| 0146551 | 3/1961 | U.S.S.R. . |
| 0216325 | 4/1968 | U.S.S.R. . |
| 0249011 | 7/1969 | U.S.S.R. ................ 73/862.06 |

OTHER PUBLICATIONS

V. A. Bobrovskii, "Two-Part Dynamometer with Variable Ranges for Cutting Force Components", Russian Eng.'ring Journal, vol. 48, No. 8, 1968, pp. 55–57.

*Primary Examiner*—Charles A. Ruehl
*Attorney, Agent, or Firm*—Pollock, Vande Sande & Priddy

[57] ABSTRACT

Device for calibrating a machine tool including a tool (32) rotating about its axis XX', comprising a tubular-shaped support with an annular fixing component (3) connecting it to the housing (1) of the machine tool so that its central opening forms an extension of the opening (2) of the housing (1) for the passage of the tool (32). The support also has at least one part (18) which is deformable under the action of twisting about the axis XX' and is provided with at least one strain gauge (19), and an end part (12) which is opposite the fixing component (3) and in which there is arranged, along the axis of the support, a component (20) for connecting the end of the tool (32), which component is provided with means (20') enabling locking of said tool in rotation with the connection component. The latter carries a disk (30) located between two annular components (31a and 31b) held against the disk (30) by adjustable means (22, 25). As a result of a measuring means associated with the strain gauge (19), a current representing the resisting torque opposing the tool (32) may be measured via the disk (30) and the components (31a and 31b). The invention relates, in particular, to machines for screwing the partitioning of a nuclear reactor core.

4 Claims, 3 Drawing Figures

DEVICE FOR CALIBRATING A MACHINE TOOL

FIELD OF THE INVENTION

The invention relates to a device for calibrating a machine tool comprising at least one tool rotating about its axis and a housing with an opening through which the tool passes.

BACKGROUND OF THE INVENTION

In pressurized-water nuclear reactors, the core composed of fuel assemblies is surrounded by a partitioning consisting of plates which are arranged vertically and are contiguous so as to reproduce the shape of the external surface of the core. These vertical plates are held in position by horizontal reinforcing plates which occupy the entire width of the space between the core shroud and the partitioning. The adjoining edges of the vertical plates are not necessarily contiguous over their entire length, and leakage gaps may exist along these edges. As there is a difference in pressure between the internal space of the partitioning and the space between the core shroud and the external surface of the partitioning, jets of water subjected to a certain pressure can be directed from the outside of the partitioning towards the inside of the partitioning. These water jets thus strike the rods of the peripheral core assemblies. It is therefore desirable to limit as far as possible this phenomenon, which may give rise to premature wear of the fuel rods arranged at the periphery of the core.

The suggestion was made, in French patent application No. 81/14,899 filed on July 30, 1981 by the present applicant, to eliminate the leakage gaps along the edges of the vertical plates of the partitioning, by machining tapped holes in these plates at the point where they overlap and by introducing into these tapped holes screws which are then tightened sufficiently to bring together the edges of the plates until they are contiguous.

The suggestion was also made in this patent application for a device for machining the tapped holes and positioning and tightening the screws.

Such a device, which must perform different functions, consists of a barrel-type machine tool which is entirely contained in a leak-proof housing the front face of which has an opening through which the tools pass. This front face of the machine tool can be applied in a leak-proof manner against the partitioning walls on which machining is performed and the screw positioned. Such a machine tool may comprise a barrel with six positions, by means of which it is possible to bring six different tools, in succession, into the working zone, these tools being displaced axially by a jack and thus passing through the opening of the housing in a centered position. Of the six tools, four which operate by rotating about their axes are driven simultaneously by the same hydraulic motor. However, only the tool in the working position is subjected to the thrusting action of the hydraulic jack in order to obtain its feed movement.

Using such a device, it is possible to work under water and without introducing machining chips into the reactor vessel.

The hydraulic rotary-drive motor and the hydraulic feed jack are supplied with fluid, the flow rate of which is controlled by means of elements which are electrically controlled by potentiometers. It is thus possible to regulate the supply rate of the jack and the hydraulic motor, thereby making it possible to adjust the feed speed of the jack and the rotational speed of the hydraulic motor. Each position of the potentiometers thus corresponds to an electrical current for controlling the elements of the hydraulic circuit supplying the jack and the hydraulic motor.

The supply pressure of the jack increases with the resisting load on the tool as far as a limit threshold. The torque exerted on the hydraulic motor increases as a function of the resisting torque.

However, if calibration of the machine tool has not been performed, the torques or axial loads corresponding to the various positions of the potentiometers are not known.

In particular, when the screwing tool is used, it is extremely important to determine to a high degree of accuracy the torque exerted on the screw, in order to know whether the residual tension in the screw is sufficient to keep the two partitions joined. It is also necessary to avoid exerting too great a torque on the screw, since this can cause it to break.

Until now, no device was known whereby it was possible to measure the dynamic torques exerted by a hydraulic motor on a set of tools which are used, for example, to tighten screws, and which exert variable resisting torques in accordance with their degree of clamping.

Similarly, no means were known for determining easily the torque and axial load exerted on a drilling, countersinking or tapping tool when used during machining. In the case where screw holes are machined in the partitions of a nuclear reactor core, these torques and loads may vary considerably, depending on the metallurgical condition of the material and the state of wear of the tools. It is thus very important to know these torques and loads so as to avoid or prevent breakage of the tools.

The screws used to eliminate the leakage gaps in a partitioning may be of the type described in the present applicant's French patent application No. 83/17,279. These screws have a fixing means for making them captive, consisting of balls which can be pushed towards the outside of the screw by a maneuvering rod so as to crush the threading of the tapped hole in which the screw is inserted. In this case, it is necessary to be able to control the thrusting load exerted on the maneuvering rod and hence the axial load of a tool for pushing the rod. In all cases, the screws arranged in the partitioning must be made captive by an element actuated by a maneuvering rod. The multi-purpose machine tool which performs machining and screwing must therefore also perform pushing and blocking of the screw maneuvering rod by means of a controlled axial load.

SUMMARY OF THE INVENTION

The object of the invention, therefore, is to propose a device for calibrating a machine tool comprising at least one tool rotating about its axis and driven in rotation by a motor whose control current, which is proportional to the torque exerted on the tool, can be regulated and measured, and a housing with an opening through which the tool passes, a device by means of which it is possible to exert a resisting torque on the tool and measure this torque by means of the current used to control its drive motor.

To this end, the device comprises:

(1) a tubular-shaped support which has an annular fixing component provided with means for integrally connecting the said fixing component to the housing, around its opening, so that the central opening of the tubular support forms an extension of the opening of the housing for the passage of the tool axially in the support, a central body comprising at least one part which is deformable under the action of twisting about the axis of the support and is provided with at least one strain gauge, and an end part which is opposite the fixing component and in which there is arranged, along the axis of the support, a component for connecting the end of the tool, which component is provided with means which make it possible to lock the tool in rotation with the connection component and carries a disk which is coaxial with the tool and is located between two annular friction components held in the end part of the support and against the disk by a means exerting an adjustable force in the axial direction; and (2) a measuring means associated with the strain gauge for measuring a current representing the resisting torque opposing the tool via the assembly consisting of the disk and the annular components making frictional contact.

In a preferred embodiment, it is also possible, using the device, to exert and measure axial resisting loads on the tool.

BRIEF DESCRIPTION OF THE DRAWINGS

In order that the invention may be more clearly understood, a description now follows, by way of a non-limiting example and with reference to the attached figures, of an embodiment of a device for calibrating a machine tool by means of which it is possible to machine and fix partitioning plates such as those described in French patent application No. 81/14,899.

DETAILED DESCRIPTION

Figure 1:
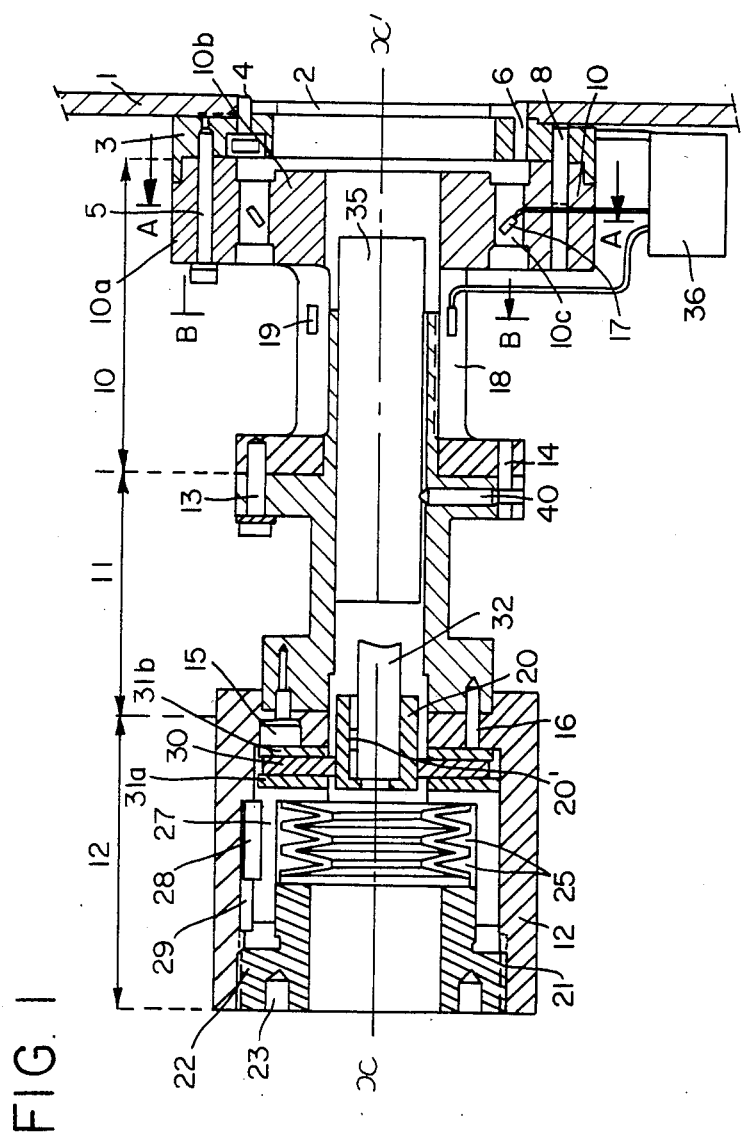
FIG. 1 is a sectional view, via a plane of symmetry, of the device in operating position on the machine tool.

FIG. 1 shows the housing 1 of the machine tool in the area of the opening 2 through which the tools pass.

The six tools, which can be used to perform the various functions of machining, screwing and clamping, are located in parallel on a barrel by means of which it is possible to bring them, in succession, into a centered position with respect to the opening 2. In its operating position, the axis of the tool consisting, for example, of a screwdriver point or a drilling bit is directed along the line XX'.

The calibration device has a support consisting of several parts with a generally tubular shape. This support is fixed to the housing 1, around the opening 2, by means of an annular fixing component 3, screws 4 and 5 and pins 6 and 8 ensuring locking in rotation.

The support consists of three distinct parts 10, 11 and 12, the components 10 and 11 being assembled by means of screws 13 and pins 14 and the components 11 and 12 being assembled by means of screws 15 and pins 16 ensuring locking in rotation.

The component 10 constitutes a deformable test piece which can be used to measure the torque and axial load.

Figure 2:
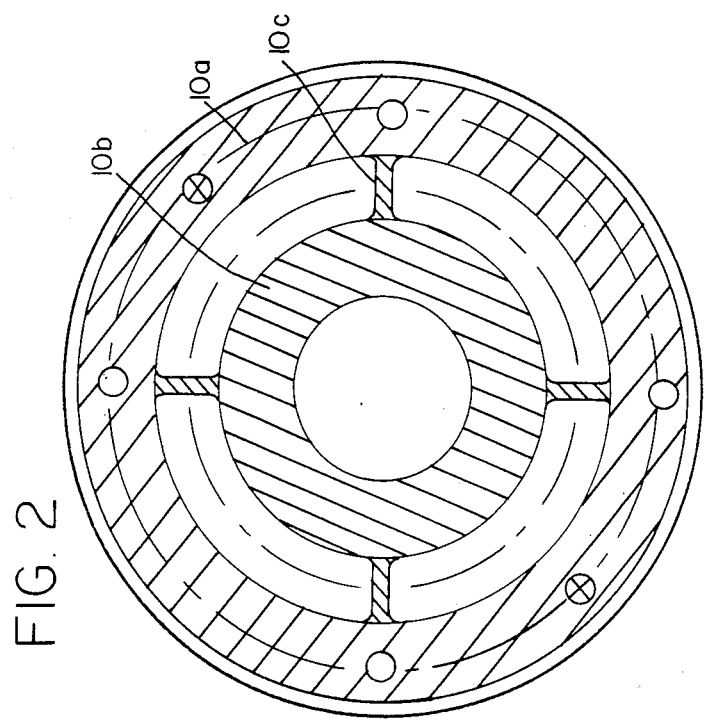
FIG. 2 is a sectional view along line A—A of FIG. 1.

This component will now be described, referring at the same time to FIGS. 1, 2 and 3. The component 10 has a base 10a which is fixed by means of the screws 5 to the fixing component 3 which itself is integrally fixed to the housing 1 by means of the screws 4. The peripheral part 10a of the component 10 is connected to the central element 10b of this component by means of four deformable radial parts 10c. A strain gauge 17 located at 45° with respect to the axis XX' of the device is located on each of these radial parts.

Figure 3:
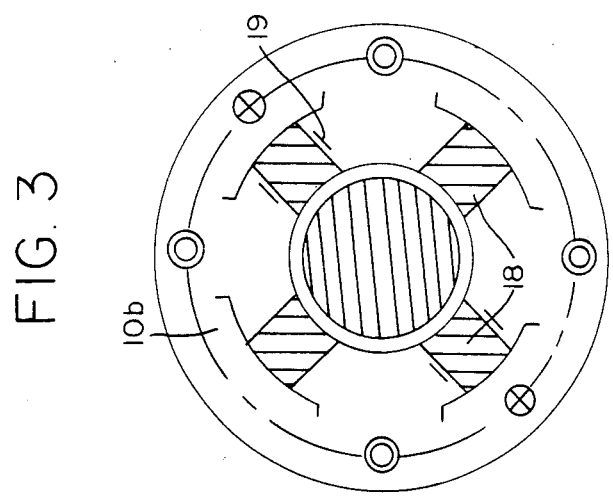
FIG. 3 is a sectional view along line B—B of FIG. 1.

As can be seen in FIGS. 1 and 3, the central element 10b comprises four deformable parts 18, each carrying a strain gauge 19 located in the direction of the axis XX'. The component 11 is integrally fixed to the component 10 by means of the screws 13 and the pins 14. The component 11 is also integrally fixed to the end part 12 of the support for the device, so that the parts 10, 11 and 12 of the support form a tubular assembly the internal cavity of which has XX' as its axis.

The end part 12 of the support consists of a bushing, the internal surface of which is machined at its end so as to form a threading 21. A nut 22 is engaged in this threading 21 and has holes 23 on its end face for engaging a tightening tool. By means of the nut 22 it is possible to tighten a set of Belleville washers 25 located between the end of the nut 22 and a tightening component 27 mounted in sliding fashion in the bushing 12 by means of a groove 29 machined in this bushing 12 and a key 28 engaged in the tightening component 27. The tightening component 27 transmits the pressure exerted by the Belleville washers 25 to two annular friction components 31a and 31b which are located on either side of a metal disk 30, the annular friction component 31b being fixed to the bottom of the bushing 12.

The disk 30 is integrally fixed to a connection component 20 consisting of a bushing, the internal surface of which is machined so as to receive the end of the tool 32. The end of the tool 32 and the connection component 20 can be locked together in rotation by a key 20'.

Finally, FIG. 1 shows a test piece 35 made of a material identical to the material of the partitions on which the machine tool to be calibrated can perform machining operations and positioning of screws. This test piece 35 is locked in rotation and in translation by means of set screws 40 and is clamped inside the central space with an axis XX' by the threaded end of the component 11 constituting a clamping jaw which closes when this component 11 is screwed inside the component 10 of the support.

The strain gauges 17 and 19 are connected to a supply and measuring assembly 36 which can be used to determine the stresses causing deformation of the parts 10c and 18 of the support for the calibration device.

Operation of the device will now be described, with reference to the set of FIGS. 1, 2 and 3, first of all with regard to calibrating the torque exerted by the hydraulic motor of the machine tool on a tool and the corresponding axial load exerted by the hydraulic jack of the machine tool, and then with regard to determining the machining conditions of the partitioning material, for example with the aid of a drilling bit.

In order to calibrate the torque exerted by the hydraulic motor, a test piece such as 35 located as shown in FIG. 1 is not used. The central space of the support for the device is thus free for the passage of a cylindrical linking component 32 which constitutes the end of the tool and is brought into the operating position by the barrel of the machine tool. The end 32 of the tool is engaged in the connection component 20 and locked in rotation relative to this component by a key 20'. The hydraulic motor for causing rotation of the screwdriver point 32 is then supplied so as to cause rotation of the tool 32 and the disk 30. In order to obtain the calibration curve of the hydraulic motor in which the supply control current of this motor or the position of the potentiometer permitting adjustment of this current is given as a function of the torque exerted, the clamping force of the annular friction components 31a and 31b is varied by tightening or loosening the nut 22, these annular friction components being made of a friction material of the type used for brake linings. In order to maintain rotation of the tool 32 at a substantially constant speed, adjustment of the potentiometer, that is to say the control current or even the supply pressure of the hydraulic motor, must be modified. For each adjustment value, the control current or the position of the potentiometer will be determined and the resisting torque opposing rotation of the disk 30 measured by means of the unit 36, this resisting torque giving rise to twisting of the deformable parts 18 of the component 10, measurable by means of the strain gauges 19. Using the unit 36 it is possible to deduce the resisting torque therefrom.

The device can also be used to calibrate the jack for axially thrusting the tool 32 which comes to rest at the end of its travel against a support surface of the connection component 20. At each axial load value obtained by varying the pressure in the jack, that is to say the position of the control potentiometer, an axial load value will be measured as a result of the strain gauges 17 and the measuring device 36.

A torque value can be made to correspond, in an unambiguous manner, to each position of the potentiometer for controlling the hydraulic motor, as can an axial load value to each position of the potentiometer for controlling the hydraulic jack.

After the screwing machine has been calibrated, it is possible to control perfectly the clamping pressure of the screws for eliminating the leakage gaps of a partitioning. It is possible, in fact, to guarantee that the screw has the residual tension required to obtain closing of the leakage gaps. From this required residual tension, it is possible to deduce easily the screwing torque and control it by means of the potentiometer for controlling the hydraulic motor, which potentiometer has been calibrated in accordance with the clamping torque.

In the same way, as a result of calibration of the potentiometer for controlling the hydraulic jack, it is possible to determine perfectly the axial load exerted by a thrusting tool such as the tool which blocks the screw locking rod.

The calibration device can also be used to perform machining tests and, for this purpose, a test piece 35 made of material identical to the material of the partitions is introduced into the central space of the tubular support, this test piece having undergone, if appropriate, hardening equivalent to that of the partitions in the reactor environment. This test piece 35 is arranged and fixed in the support of the device, as shown in FIGS. 1 and 3. The machining tests can relate, for example, to drilling using a bit, to countersinking or to tapping , these being three operations which must be carried out on the partitions.

The machine tool is equipped with a drilling bit for example and this tool is made to rotate by means of the hydraulic motor and brought into the working position by means of the thrusting jack. It is then possible to perform various machining tests by varying the value of the torque exerted on the tool and the value of the axial load of the thrusting hydraulic jack.

For example, it is possible to perform endurance tests on the drilling bits by continuing with machining until the drilling bit has worn out completely. These tests require, of course, the use of a fairly large number of test pieces 35 which are then examined in order to check the quality of machining.

The same tests can be performed using the tapping tool. Such tests show that the value of the torque required for tapping increases as the tool wears out. It is thus possible to determine the maximum number of tapping operations which can be performed using a tool without the risk of breakage, that is to say such that the resisting torque remains well below the breakage limit of the tool.

Therefore, as a result of the calibration operations and tests performed using the device according to the invention, it is possible to determine perfectly the optimum machining conditions, to know at each moment the torque and axial load applied to the tool and to avoid any danger of breakage of the tool during drilling and tapping for example.

The invention is not limited to the embodiments which have been described; on the contrary, it comprises all the variants thereof.

Thus, in place of a nut and a set of Belleville washers, it is possible to use other means to apply a variable axial load on the friction rings surrounding the disk integrally fixed to the end of the tool. For example, a hydraulic thrusting jack can be used.

The deformable surfaces used to measure the axial shearing load and the torsional couple can be provided in a different form from those already described. In the example of embodiment, the support for the calibration device has three different components, the test piece 10 comprising the set of deformable elements on which the strain gauges are arranged. As a result of this arrangement, it is possible to replace the component comprising the deformable parts after a certain period of use, without having to change the other components. However, this support can also be designed as a single component or as two parts.

The invention relates to any machine tool comprising a tool which rotates about its axis and on which a certain torque is exerted during machining, this torque having to be controlled in a precise manner.

I claim:

1. Device for calibrating a machine tool comprising at least one tool (32) rotating about its axis XX' and driven in rotation by a motor whose control current, which is proportional to the torque exerted on the tool (32), can be regulated and measured, and a housing (1) with an opening (2) through which the tool (32) passes, which device comprises a tubular-shaped support which has an annular fixing component (3) provided with means (4, 6) for integrally connecting the said annular fixing component to the housing (1), around its opening (2), so that the central opening of the tubular support forms an extension of the opening (2) of the housing (1) for the passage of the tool (32) axially in the support, a central body (10) comprising at least one part (10c, 18) which is deformable under ' the action of twisting about the axis XX' of the support and is provided with at least one first strain gauge (17, 19) and an end part (12) which is opposite the fixing component (3) and in which there is arranged, along the axis of the support, a component (20) for connecting the end of the tool (32), which component is provided with means (20') which make it possible to lock the tool (32) in rotation with the connection component (20) and carries a disk (30) which is coaxial with the tool and is located between two annular friction components (31a and 31b) held in the end part of the support and against the disk (30) by a means (22, 25) exerting an adjustable force in the axial direction, and a first measuring means (36) associated with the strain gauge (19) for measuring a current representing the resisting torque opposing the tool (32) via the assembly consisting of the disk (30) and the annular components (31a and 31b) making frictional contact.

2. Calibration device as claimed in claim 1, wherein the tubular-shaped support comprises at least one part (10c) which is deformable under the action of an axial load and is provided with at least one second strain gauge (17) associated with a second measuring means (36) for measuring a current representing the axial load applied to the tool.

3. Calibration device as claimed in claim 1 or 2, which can be used for machining tests by the machine tool and which comprises means (11) for fixing a test piece (35), made of the material to be machined, in the central space of the tubular support.

4. Calibration device as claimed in claim 2, wherein the part which is deformable by twisting under the action of the torque and the part which is deformable under the action of the axial load are machined on the same component (10) comprising a part of the tubular support which consists of at least two parts comprising the component (10) and the end part (12).

* * * * *